Feb. 12, 1929.  
E. GRANAT  
DIFFERENTIAL ELECTRIC DISTANT CONTROL DEVICE  
COMPRISING STATIC TRANSMITTERS  
Filed Aug. 3, 1926  
1,701,671  
3 Sheets-Sheet 1

Inventor  
E. Granat  
By Marks & Clerk  
Attys.

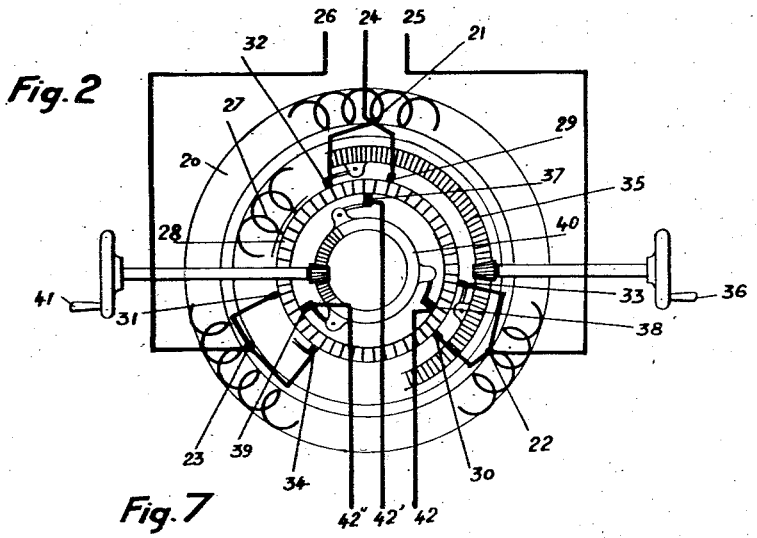
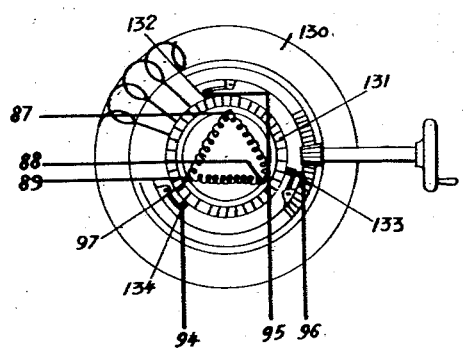
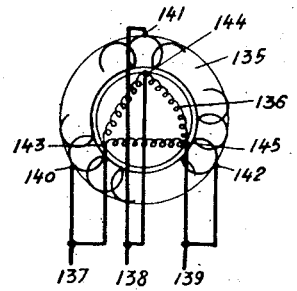
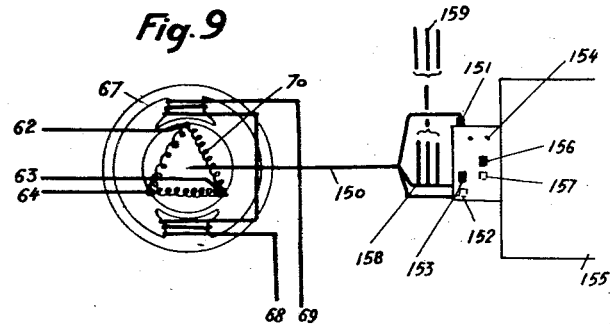

Feb. 12, 1929. 1,701,671
E. GRANAT
DIFFERENTIAL ELECTRIC DISTANT CONTROL DEVICE
COMPRISING STATIC TRANSMITTERS
Filed Aug. 3, 1926  3 Sheets-Sheet 3
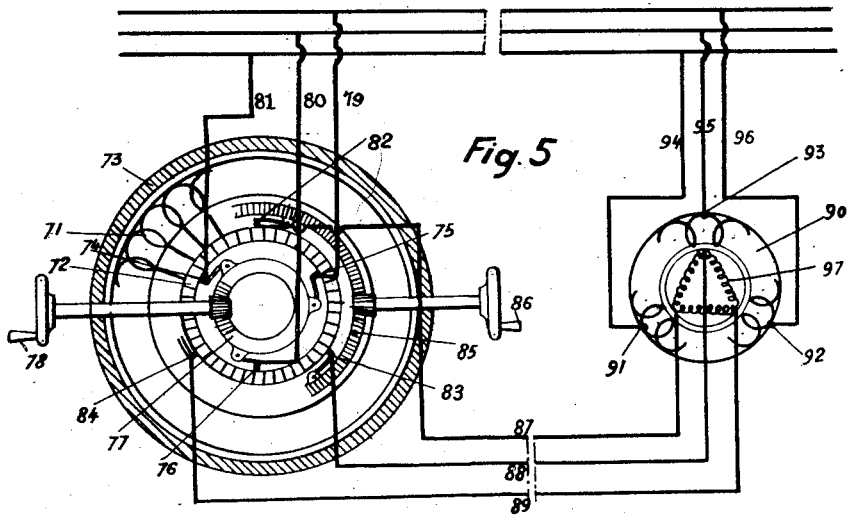
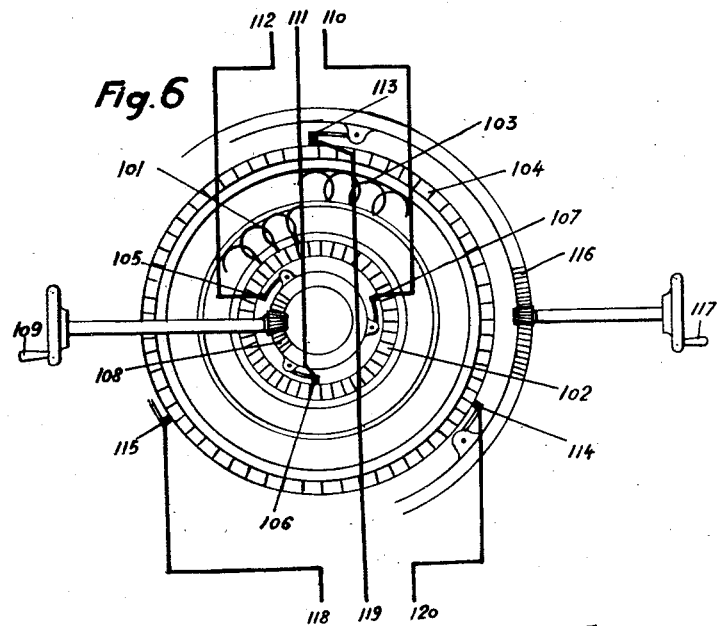
Inventor
E. Granat
By Marks and Clerk
Atty/s.

Patented Feb. 12, 1929.

1,701,671

UNITED STATES PATENT OFFICE.

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE.

DIFFERENTIAL ELECTRIC DISTANT CONTROL DEVICE COMPRISING STATIC TRANSMITTERS.

Application filed August 3, 1926, Serial No. 126,833, and in France October 5, 1925.

I have already described differential electric distant control devices comprising transmitters constituted by electric machines, either motors or generators fed either with direct or polyphase current and provided with a commutator against which rub two or more sets of movable brushes controlled each by a corresponding control device, the movements of rotation of which are to be added algebraically. These sets of brushes are connected one with the feeding line and the remainder with the transmission line or lines.

A differential distant control device of this type adapted to be fed with direct current is described in my patent application Ser. No. 21,175 (Fig. 1) filed on Sept. 14, 1925, and the title of which is: Electric differential control system.

Another control device adapted to be fed with alternating or polyphase current is described in my patent application Ser. No. 56,380, filed on Sept. 14, 1925, and the title of which is Polyphase distant control system for differential transmission.

In some cases the use of transmitters constituted by electric machines, either motors or generators, can because they require these dynamic machines, prove disadvantageous and show one or more of the following drawbacks:

Bulkiness,

Difficulty of machining and mounting,

Up-keep and lubrication of the rotating parts,

Heat developed in some parts by friction.

My invention described hereinbelow has for its object to do away with these drawbacks. It consists chiefly in using as a transmitter for the differential electric distant control device a device comprising stationary windings.

These static transmitters can be of different types. Some can be fed with direct current and others with one-phase or polyphase alternating current. They comprise one or more commutators on which rub on one hand a set of movable feeding brushes controlled by one of the parts the movement of which is to be transmitted and on the other hand one or more sets of brushes connected with the transmission line and controlled by the part or parts the movement of which is to be added algebraically to the movement of the first part mentioned hereinabove.

A drawback of distant control devices comprising static transmitters lies in the fact that they do not allow the controlled part to be moved in a continuous manner, it can only be moved in a discontinuous manner and occupy in succession a given number of predetermined positions. The reason of this is that the movable brushes of the transmitter which are connected with the transmission wires move over a stationary commutator and that therefore the number of positions of the movable brush set corresponding to different electric combinations liable to give the movable part of the receiver a different position is limited.

My invention comprises also means for avoiding this drawback by a suitable choice of the number of commutator segments as compared with the number of movable brushes connected with the line wires. This will be disclosed with more detail hereinafter.

The invention comprises, further, devices allowing the position of the final receiving part of the transmission to be corrected at the receiving station.

Lastly the invention discloses an arrangement which shows the great advantage of requiring in the different control stations simple or differential transmitters either dynamic or static, of only small output whereby their bulkiness is much reduced. This is provided by the fact that these transmitters control only the rotation of a synchronous receiving motor actuating a set of movable brushes rubbing on the commutator of a transmitter having a high output.

The connecting wires starting from these brushes feed in their turn one or more synchronous receivers of high output. I obtain in this manner a power amplifying device causing no delay.

By way of example I have described hereinbelow and shown on appended drawings several forms of execution of differential electric distant control devices comprising a static transmitter.

In order to be readily understood I have described first with reference to the appended drawings the previous arrangements invented by me and working with dynamic transmitters.

Figs. 1 and 2 show respectively two dynamic transmitters for differential distant control devices adapted to be fed, the first with direct current, the second with three phase-current.

Fig. 5 shows a differential control device working with a static transmitter and adapted to be fed with three phase current.

Fig. 6 is a modified form of the transmitter of a differential control device of the type shown in Fig. 5.

Fig. 7 shows an arrangement for use with the receiver of the differential distant control device shown in Fig. 5 whereby the position of the final receiving part of the transmission can be corrected at the receiving station.

Fig. 8 shows a modified form of the receiver of the differential distant control devices shown in Figs. 3 and 5.

Fig. 9 shows a device providing for a differential distant electric control and yielding at the receiver a great power though it requires for the transmission only static or dynamic transmitters having a small output.

Figure 1:
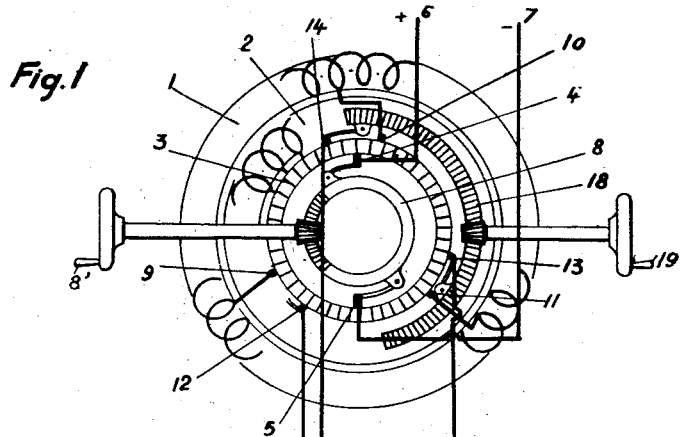

According to Fig. 1 the dynamic transmitters of the differential distant control device adapted to be fed with D. C. and described in my patent application 21,175 has been diagrammatically drawn in the following manner: An electric dynamo machine, either a motor or a generator comprises a distributed inducing stator 1 and a rotor 2 provided with a commutator 3. Two brushes 4—5 can rub on this commutator and feed the armature with direct current supplied through the line wires 6—7. These two feeding brushes 4 and 5 are borne by a movable holder 8 the movement of which is obtained through the handwheel 8'. These said feeding brushes are connected with the feeding wires 6 and 7 through an arrangement, not shown on the diagrammatical sketch of rings and of sliding contacts of the usual type.

On the commutator 3 of the armature of the dynamo-electric machine rub also three stationary equidistant brushes 9—10—11 connected with three equidistant points of the winding of the stator 1.

On this same commutator 3 rub also three movable brushes 12—13—14 respectively connected through rings and sliding contacts not shown with three transmission wires 15—16—17 connecting the transmitter with the receiver. These brushes are mounted on a movable holder 18 controlled by a handwheel 19.

Figure 3:
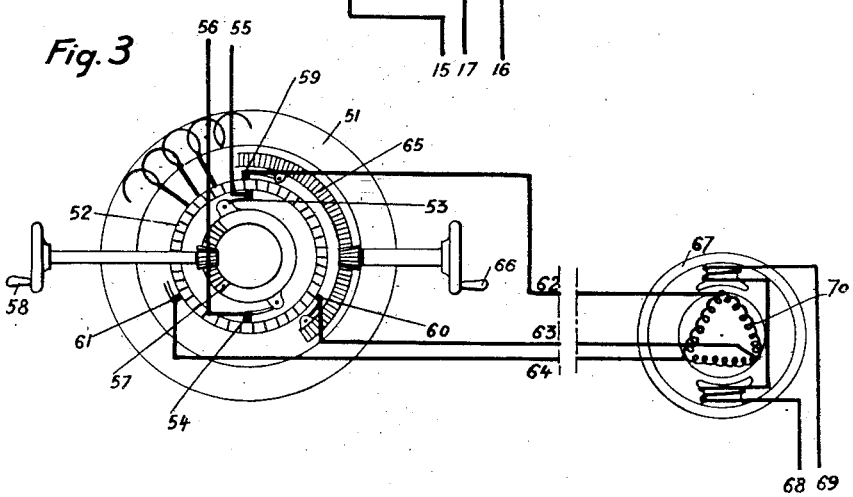
Fig. 3 shows a differential distant control device working with a static transmitter and adapted to be fed with direct current or with one-phase alternating current.

I have explained in my previous patent application 21,175 that the movement of the rotor of the receiver (which is the same as that shown in the transmission illustrated by appended Fig. 3) gave the algebraical sum of the rotations of the movable feeding brushes 4—5 controlled by the handwheel 8' and of the movable brushes 12—13—14 controlled by the handwheel 19 and connected with the transmission line.

The transmitter shown diagrammatically on Fig. 2 and which is the same as the one described in my previous patent application Ser. No. 56,380, dated September 14, 1925, and illustrated on Fig. 4 of this said application comprises the following parts constituting a dynamo-electric machine, either a motor or a generator.

A field stator 20 provided with three equidistant terminals 21—22—23 connected with the wires 24—25—26 of a three phase feeding line.

A rotor 27 the sections of which are connected with the segments of the commutator 28. On this commutator rub three sets of brushes.

1. A group of three stationary brushes 29, 30, 31 connected with the terminals 21—22—23 of the stator.

2. A group of three movable brushes 32—33—34 also connected by means of rings and sliding contacts not shown with the same current terminals 21, 22, 23 of the stator; these three movable brushes 32, 33, 34 are borne by a movable holder 35 controlled by a handwheel 36.

3. A group of three movable brushes 37—38—39 borne by a movable holder 40 controlled by a handwheel 41. These three last movable contacts 37, 38, 39 are connected through rings and sliding contacts not shown with the three transmission wires 42, 42', 42" connecting the transmitter with the receiver.

As explained in my previous aforementioned patent application, the rotations of the movable part of the receiver are in this device the sum of the rotations of the movable feed brushes 32, 33, 34 controlled by the hand wheel 36 and of the movable brushes 37, 38, 39 connected with the transmission wires and controlled by the handwheel 41.

After having recalled the dynamic arrangements previously imagined by me it will be easier for me to explain the static devices which are the object of the present invention.

In Fig. 3, the transmitter comprises in the first place a stationary stator 51 comprising a closed winding wound on a magnetic structure and a commutator 52 connected with the terminals of the several sections of the winding.

On this commutator rub on one hand two feed brushes 53, 54 connected by rings and sliding contacts not shown to a direct or one-phase feeding line 55—56 and borne by a movable holder 57 controlled by the hand wheel 58.

On the other hand the three movable brushes 59, 60, 61 connected through rings and sliding contacts not shown with the three transmission wires 62, 63, 64 are borne by a movable holder 65 controlled by the handwheel 66.

The receiver is constituted by a so-called auto-synchronous motor comprising a field stator 67 fed by means of direct or one-phase line wires 68—69 and a three-phase rotor 70 connected through rings and sliding contacts not shown with the three transmission wires 62, 63, 64.

The working of this device is the following:

If the holder of the movable brushes 59, 60, 61 connected with the transmission wires remains stationary and if the two feed brushes 53, 54 are moved by means of the handwheel 58 the distribution of the potentials under the three brushes 59, 60, 61 is shifted by a corresponding amount, and thereby the resulting field of the armature 70 of the receiving motor is rotated. This motor is thus controlled by the rotation of the two feeding brushes 53—54 controlled by the handwheel 58.

If on the other hand the feeding brushes 53—54 remain stationary and the set of three movable brushes 59, 60, 61 connected with the transmission wires is moved, the phase of the potential under these brushes is modified whereby the resulting field of the armature of the receiver is caused to rotate by a corresponding amount equal to the rotation of the three movable brushes 59—60—61.

In the differential control device shown on Fig. 5, the transmitter is a static machine devised as follows: A winding connected as an auto-transformer 71 has its different sections connected with the segments of the commutator 72. This winding is wound on a magnetic core diagrammatically shown at 73.

On this commutator rub two sets of movable brushes: on one hand three feeding brushes 74, 75, 76 borne by a movable holder 77 controlled by a handwheel 78 and connected with the three line wires 79, 80, 81 of a three-phase feeding line; on the other hand three transmission brushes 82, 83, 84 mounted on a movable holder 85 controlled by a handwheel 86 and connected with the three line wires 87, 88, 89 connected with the receiver.

The receiver is constituted by a motor with a double winding comprising a three-phase stator 90 the three equidistant terminals 91, 92, 93 of which are fed through the three wires 94, 95, 96 of the same three-phase transmission which feeds the transmitter and a three-phase rotor 97 connected through rings and sliding contacts not shown with the three line wires 87—88—89.

The working of the device is the following.

If the two sets of movable brushes remain stationary, the two rotating fields of the rotor and of the stator of the receiving motor rotate at the same speed and therefore the rotor is stationary but any motion either of the movable set of feeding brushes 74, 75, 76 or of the movable set of transmission brushes 82—83—84 will have for its effect a corresponding rotation of the rotor of the receiver.

Fig. 6 shows a modified form of the transmitter shown on Fig. 5. In this modified form, the auto-transformer winding 71 is replaced by a transformer having two independent windings, primary and secondary, acting one on the other. By means of this latter arrangement the feeding voltage of the controlled electric transmission can be raised or lowered, this proving advantageous in certain cases.

The transformer comprises a primary winding 101 the sections of which are connected with the segments of the commutator 102 and a secondary winding 103 the sections of which are connected with the segments of the commutator 104.

On the collector 102 of the primary winding rub three movable equidistant brushes 105—106—107 borne by a holder 108 controlled by a handwheel 109 and connected with the three phase feeding wires 110, 111, 112.

On the collector 104 of the secondary winding 103 rub three movable brushes 113, 114, 115 borne by a holder 116 controlled by a handwheel 117 and connected with the three transmission wires 118—119—120. These transmission wires are connected with the rotor of a motor of the type illustrated by Fig. 5.

Figure 4:
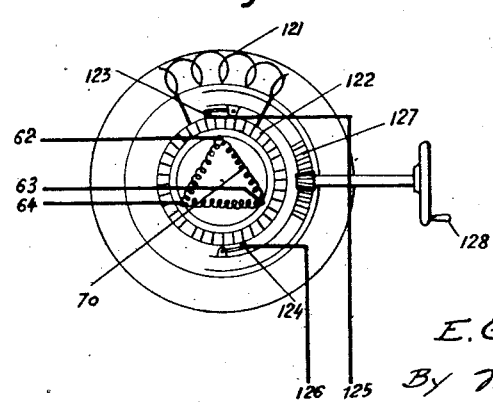
Fig. 4 shows an arrangement for use with the receiver of the differential control device shown on Fig. 3 whereby a correction can be made at the receiving station to the position of the final receiving part of the transmission.

The working of the arrangement is the same as in Fig. 5; according to the diagrams shown on Figs. 4 and 7, the receivers of the differential control device, shown on Fig. 3 and on Figs. 5 or 6 can be arranged so as to allow the position of the rotor of the receiver to be directly corrected at the receiver itself.

According to the diagram shown on Fig. 4 and corresponding to the control device illustrated by Fig. 3, the receiver is constituted by a field stator provided with a distributed winding 121 the sections of which are connected with the commutator 122. On this commutator rub two movable brushes 123, 124 connected by rings and sliding contacts not shown, with two direct or one-phase line wires 125, 126. These two brushes are mounted on a movable holder 127 controlled by a handwheel 128. The three-phase rotor does not show any modifications over that previously described and is constituted by a winding 70 fed by the three transmission wires 62—63—64.

By making the set of brushes 123, 124 rotate, the resulting field of the field stator will move by a corresponding angle and thereby the three-phase rotor of the receiver will rotate by the same angle. Thus it is possible to add algebraically to the transmitted rotations a correction at the receiver itself.

In the receiver shown on Fig. 7 which is a modification of that of Fig. 5 for a differential control arrangement fed with three-phase current, the field stator 130 is a distributed winding the sections of which are connected with a commutator 131. The rotor is the usual three-phase rotor 97 connected by means of rings and sliding contacts with the three wires of the transmission 87, 88, 89.

On the commutator 131 of the field piece rub three brushes 132, 133, 134 connected respectively with the three wires 94, 95, 96 of the three phase feeding line which also feeds the transmitter.

By rotating the movable set of brushes 132—133—134, the phase of the voltage feeding the field stator can be varied whereby a corresponding rotation of the rotor of the receiver is obtained.

Fig. 8 shows a receiving motor provided with a double polyphase winding both parts of which are fed by a shunt taken from the transmission wires. The stator 135, the rotor 136 are both fed by three wires of the distant control arrangement 137—138—139 by means of shunt connections between the three terminals 140—141—142 of the stator and the three terminals 143—144—145 of the rotor winding.

The working of this device is the following:

If the two windings 135—136 have the same number of poles the connections are disposed so that the fields arising in the rotor and in the stator rotate in opposite directions whereby their angular relative displacement for any movement of one of the controlling devices is double the absolute rotation of each field taken per se. Under these conditions, any movement of one of the controlling devices of the transmitter will cause a rotation of the rotor 136 by double the amount.

If the said windings do not have the same number of poles the connections will be made so that the two fields, that of the stator and that of the rotor rotate in the same direction. Each rotation of one of the controlling devices of the transmitter will have for its effect to provide a corresponding rotation of the rotor 136 of the receiver which is in a given ratio with that of the said controlling device.

If for instance the winding of the stator comprises $2p$ poles and that of the rotor $2(p-1)$ poles: for a rotation $a$ of one of the sets of the movable brushes of the transmitter, the field of the stator will rotate by $\frac{a}{p}$ and that of the rotor by $\frac{a}{p-1}$. Thus the rotor will rotate by $\frac{a}{p-1}-\frac{a}{p}=\frac{a}{p(p-1)}$.

This device shows thus the advantage of providing an electric vernier.

The use of such a receiver shows great advantages in the case where the current feeding the transmitter cannot be used for feeding the receiver.

A drawback of static transmitters for distant control arrangements resides in the fact that the number of positions of the receiver is limited, as explained hereinbefore. I will now show it is possible by a proper choice of the number of brushes of the transmitter connected with the transmission wires as compared with the number of segments of the commutator on which these brushes rub, to obtain a great number of positions for the receiver, which practice amounts to having the advantages provided by distant control devices with dynamic transmitters allowing a continuous movement.

I have discovered the following formulæ.

Suppose $a$ is the number of brushes of the transmitter connected with the transmission line, $n$ the number of segments of the commutator on which rub these brushes, $p$ the number of positions which the rotor of the receiver can take:

1. If $n$ is a multiple of $a$, $p$ is equal to $n$ or otherwise stated, the number of positions is equal to the number of segments of the commutator, 2. If $n$ is not an exact multiple of $a$ the number of positions is given by the formula $p=2 n \times a$. Suppose $d$ is the greatest common divisor between $a$ and $n$: we have:

If $n$ is a multiple of $a$, $p$ is equal to $n$ or otherwise the number of positions is equal to the number of the segments of the commutator.

If $n$ is not a multiple of $a$, the number of the positions is given by $p=\frac{2na}{d}$ If there is between $n$ and $a$ no common divisor, but unit, then $d=1$ and the number of positions is given by the formula $p=2na$.

The table given hereunder shows for a three-wire transmission the number of positions $p$ corresponding to the number of segments $n$ of the commutator. It can be seen by this table that the cases where $n$ is a multiple of $a$ are particularly disadvantageous and that on the contrary the other cases give values of $p$ which increase with the number of segments. The number of segments will therefore according to the present invention be chosen so as to correspond to the number of positions which is desired to transmit.

| | | | | | | | | | | | | | | |
|---|---|---|---|---|---|---|---|---|---|---|---|---|---|---|
| a=2 | n | 2 | 3 | 4 | 5 | 10 | 11 | 12 | 13 | 14 | 15 | | | |
|  | p | 2 | 12 | 4 | 20 | 10 | 44 | 12 | 52 | 14 | 60 | | | |
| a=3 | n | 2 | 3 | 4 | 5 | 6 | 7 | 8 | 9 | 10 | | | | |
|  | p | 12 | 3 | 24 | 30 | 6 | 42 | 48 | 9 | 60 | | | | |
|  | n | 11 | 12 | 13 | 14 | 15 | 16 | 17 | 18 | | | | | |
|  | p | 66 | 12 | 78 | 84 | 15 | 96 | 102 | 18 | | | | | |
|  | n | 19 | 20 | 21 | 22 | 23 | 24 | 25 | 26 | | | | | |
|  | p | 114 | 120 | 21 | 132 | 138 | 24 | 150 | 156 | | | | | |
|  | n | 28 | 31 | 35 | 39 | 43 | 45 | 48 | 49 | 50 | 55 | 61 | 68 | 70 |
|  | p | 168 | 186 | 210 | 39 | 258 | 45 | 48 | 294 | 300 | 330 | 366 | 408 | 420 |
| a=4 | n | 2 | 3 | 4 | 5 | 6 | 7 | 8 | 9 | 10 | 11 | 12 | 13 | 14 |
|  | p | 2 | 24 | 4 | 40 | 24 | 56 | 8 | 72 | 40 | 88 | 12 | 104 | 56 |
| a=5 | n | 2 | 5 | 7 | 8 | 9 | 10 | 11 | 12 | 13 | 14 | 15 | 16 | 21 |
|  | p | 20 | 5 | 70 | 80 | 90 | 10 | 110 | 120 | 130 | 140 | 15 | 160 | 210 |

In the case where the power transmitted by a distant control arrangement is to be amplified, that is if the small power distant control arrangement is to be followed by a high power distant control arrangement it is of particular advantage, for obtaining a non-delayed power amplifying transmission, to use the receiving motor of one of the small power distant control arrangements described hereinabove. For controlling the rotation of a set of movable brushes of a transmitter constituted by a high power machine (motor or generator) the receiver of which controls the part to be actuated.

According to the diagram shown on Fig. 9 the receiver of the distant control device, illustrated on the left hand side, is constituted like the one shown on Fig. 3 by a field stator 67 which is fed with direct or one-phase current and by a three-phase rotor 70 fed by the three wires 62, 63, 64 of the transmission. The shaft 150 of the rotor bears the movable set of three equidistant brushes 151, 152, 153 rubbing on the commutator 154 of the transmitting motor 155 fed with one phase or direct current through the brushes 156—157. The three movable brushes 151—152—153 are connected by three rings 158 with the three line wires 159 connecting the motor 155 with one of the receivers it controls.

The working is the following:

All the controlling operations made at the transmitter of the first static small power distant control arrangement are added on the rotor 70 of its receiver; all the movements of this rotor 70 are transmitted to the three brushes 151—152—153 of the transmitter 155 which transmits them to the several receivers it controls.

What I claim is:

1. A differential electric distant control arrangement comprising a transmitter constituted by a stationary winding, means whereby this winding is fed from the mains through equidistant points, means for controlling the position of these points on the said winding, wires through which energy is removed from said winding, means for controlling the phase of this energy with reference to the winding and a receiver one component of which is fed directly by the said wires and the other is fed with current, the difference in phase of which with reference to the first component is a function of that of the energy fed from the transmitter with reference to the mains.

2. A differential electric distant control arrangement comprising a transmitter constituted by a stationary winding, a stationary commutator connected therewith, a set of movable brushes adapted to rub on said commutator and connected with the mains, a handwheel controlling said movable brushes, another set of movable brushes through which energy is removed from said winding, wires connected with said brushes, a handwheel adapted to control the angular position of the last mentioned brushes with reference to the first set, a receiver one component of which is fed directly by the said last mentioned wires and the other is fed with current the difference in phase of which with reference to the first component is a function of that of the energy fed from the transmitter with reference to the mains.

3. A differential electric distant control arrangement comprising a transmitter constituted by two stationary interacting windings, two commutators connected respectively with each winding, two sets of movable brushes adapted to rub respectively on each commutator, means for controlling the position of each set of brushes with reference to its commutator, a receiver, wires connecting respectively one set of brushes with the A. C. mains and the other with one component of the receiver and means for feeding the second component of the receiver with current the phase displacement of which with that feeding the first component is in a simple ratio with that of the last mentioned current with reference to the mains.

4. A differential electric distant control arrangement comprising a transmitter constituted by a stationary winding, a stationary commutator of $n$ segments connected therewith, a set of $a$ movable brushes adapted to rub on said commutator and connected with the mains $n$ and $a$ having a very small common divisor, a handwheel controlling said movable brushes, another set of movable brushes through which energy is removed from said winding, wires connected with said brushes, a handwheel adapted to control the angular position of the last mentioned brushes with reference to the first set, a receiver one component of which is fed directly by the said last mentioned wires and the other is fed with current the difference in phase of which with reference to the first component is a function of that of the energy fed from the transmitter with reference to the mains.

5. A differential electric distant control arrangement comprising a transmitter constiby this winding is fed from the mains through equidistant points, means for controlling the position of these points on the said winding, wires through which energy is removed from said winding, means for controlling the phase of this energy with reference to that in the winding and a receiver both components of which are fed directly by the said wires, the connections with the two components being made in opposite manner.

6. A differential electric distant control arrangement comprising a tranmitter constituted by a stationary winding, means whereby this winding is fed from the mains through equidistant points, means for controlling the position of these points on the said winding, wires through which energy is removed from said winding, means for controlling the phase of this energy with reference to that in the winding, a receiver, a set of movable brushes fed directly by said wires and adapted to feed one component of said receiver, a handwheel controlling said brushes and means whereby the other component of the receiver is fed with current the phase displacement of which with reference to the first component is in a simple ratio with that of the latter with reference to the mains.

7. A differential electric distant control system comprising in series static control arrangements as claimed in claim 1 and dynamic control devices, the rotor of the receiver of each arrangement and device controlling the controlling part of the following transmitter.

In testimony whereof I affix my signature.

ELIE GRANAT.